April 2, 1968     D. C. MARLOW     3,375,861
SUPPORT MEMBERS
Filed Aug. 10, 1964     3 Sheets-Sheet 1
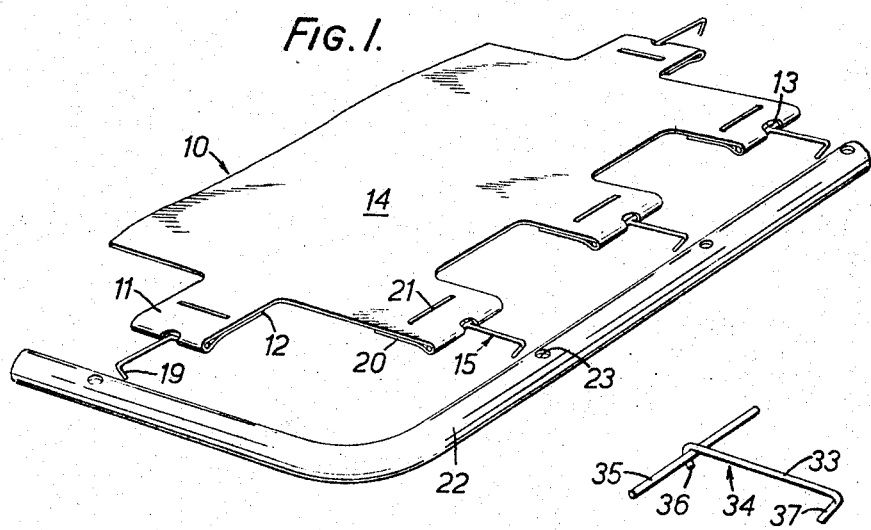
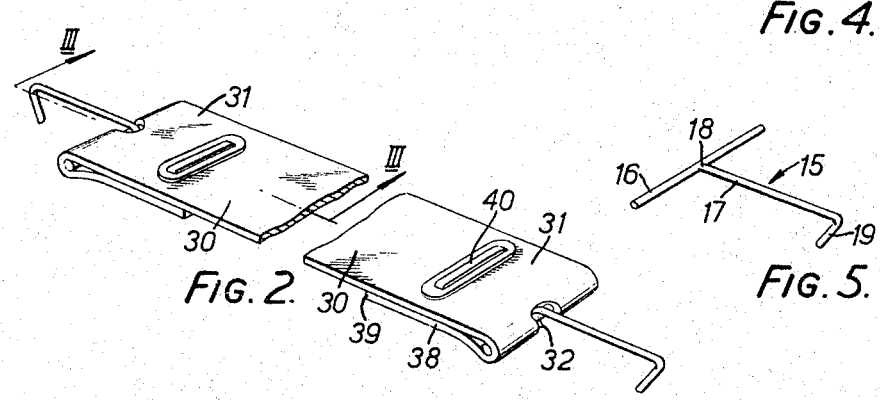
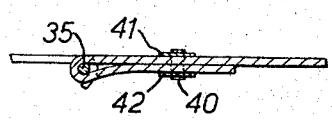
INVENTOR
DOUGLAS CHARLES MARLOW
BY
Shoemaker and Mattare
ATTORNEYS April 2, 1968  D. C. MARLOW  3,375,861
SUPPORT MEMBERS
Filed Aug. 10, 1964  3 Sheets-Sheet 2
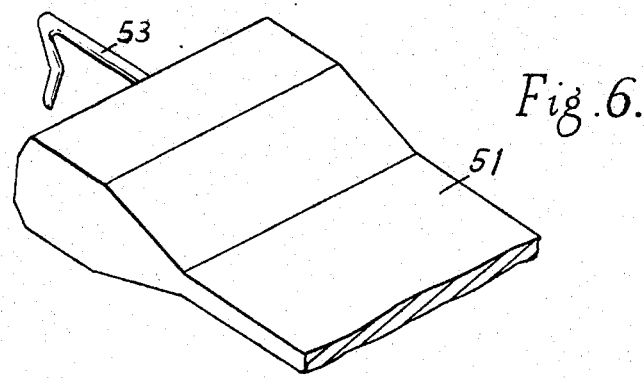
Fig.6.
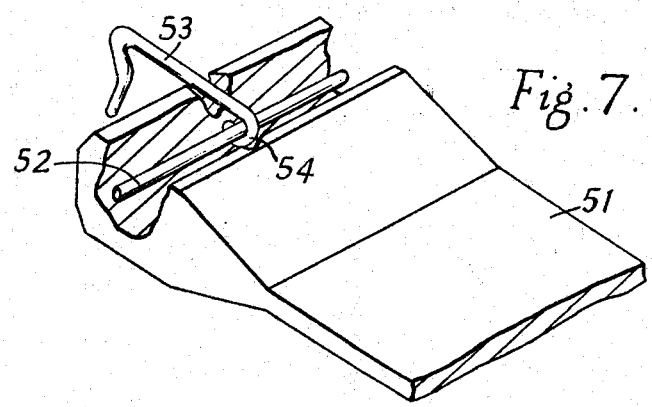
Fig.7.
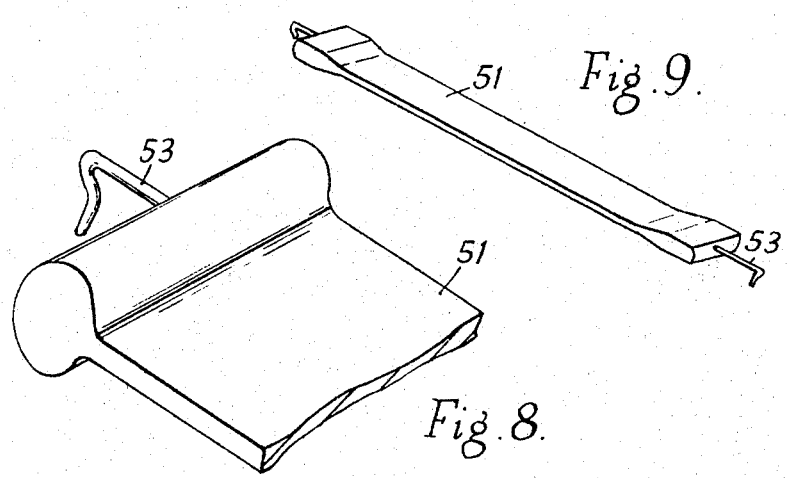
Fig.9.
Fig.8.
INVENTOR
DOUGLAS CHARLES MARLOW
BY
Shoemaker and Mattare
ATTORNEYS

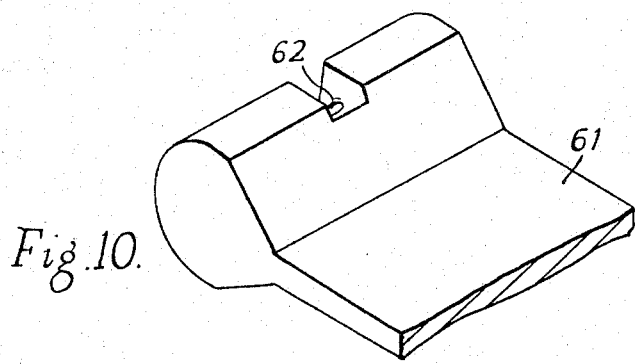
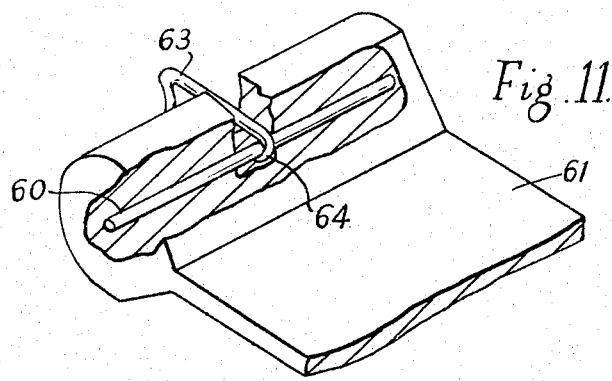
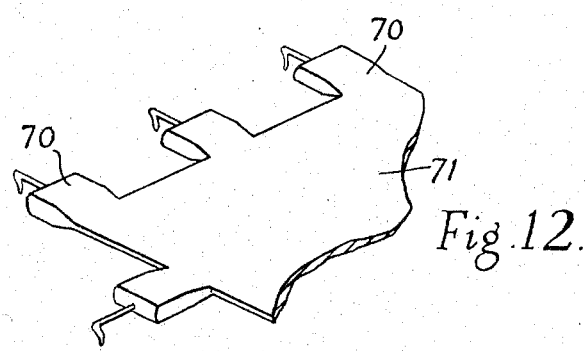

United States Patent Office 3,375,861
Patented Apr. 2, 1968

3,375,861
SUPPORT MEMBERS
Douglas Charles Marlow, Etwall, England, assignor to Pirelli Limited, London, England, a British company
Continuation-in-part of application Ser. No. 307,592, Sept. 9, 1963. This application Aug. 10, 1964, Ser. No. 388,612
Claims priority, application Great Britain, Sept. 13, 1962, 35,035/62; Aug. 13, 1963, 31,894/63
10 Claims. (Cl. 160—371)

This application is a continuation-in-part of my application Ser. No. 307,592 filed Sept. 9, 1963, now abandoned.

The invention relates to a support member for use with frames in supporting loads and is especially although not exclusively, applicable for use in the furniture industry and in connection with automobile seats.

Support members of resilient material are used to support cushions, mattresses or the like on articles of furniture, chairs and beds and may be made from various materials formed in various ways. A support member may comprise for example a strip of an elastomeric material such as rubber or resilient webbing consisting of fabric material impregnated with an elastomeric material which can be stretched across a frame in combination with a series of like strips to provide a resilient platform-like structure.

In another arrangement the support member may be in the form of a single platform made from an elastomeric material or resilient material of the kind set forth above which extends across substantially the whole area to be covered within the frame as a single piece and on which a cushion or the like can be placed or which may for example form the seat itself.

The frame with which such support members are used usually defines approximately the outer circumference of the supported surface and the support member must be provided with means for securely attaching it to the frame such attachment means being able to withstand the applied load.

Thus each of the strips of resilient material mentioned above must have means at each of the ends for attachment to the frame, and the resilient platform must have a number of attachment points to maintain it in position in relation to its frame.

The invention will now be described with reference to the accompanying drawings in which:

FIGURE 1 illustrates in perspective part of a platform having a plurality of extremities each provided with an attachment member for the purpose of securing said platform at a plurality of separate positions, spaced along a rigid tubular frame;

FIGURE 2 illustrates in perspective a foreshortened strip having two extremities each of which is provided with an attachment member for securing said strip at two opposite locations on, for example, a tubular frame;

FIGURE 3 is a section taken on the line III—III of FIGURE 2;

FIGURES 4 and 5 illustrate in perspective the two types of attachment member shown repectively in FIGURES 2 and 1;

FIGURES 6 and 7 illustrate one free end of a tape or strip in perspective and in perspective partly cut away, respectively, in accordance with one aspect of the invention;

FIGURE 8 illustrates a variation of moulding of the end of the tape or strip;

FIGURE 9 illustrates a complete tape;

FIGURES 10 and 11 illustrate one free end of a tape or strip in perspective and in perspective partly cut away, respectively, in accordance with a second aspect of the invention; and FIGURE 12 illustrates the application of the embodiment of FIGURES 6 and 7 to the free ends of a sheetlike platform of which only a part is shown.

Referring to FIGURE 1, there is illustrated a platform 10 having a plurality of free ends 11, each of which has a free edge 12. An aperture 13 is formed in each free end at a location between said free edge 12 and the body portion 14 of the platform 10. An attachment member indicated generally at 15 engages each free end, and said attachment member will be seen from FIGURE 5 to consist of a support arm 16 and an attachment arm 17. The attachment arm 17 is connected at one end thereof by welding which is indicated at 18, and a hook portion 19 is formed at the other end of the attachment arm by bending.

Referring again to FIGURE 1, the attachment arm 17 extends through the aperture 13 and a portion 20 is folded back upon itself along a diametral line of the aperture 13, said diametral line being parallel or substantially parallel to the free edge 12. When thus folded back the two portions of the free end 11 are secured to one another by a staple 21. In order to attach the platform 10 to, for example, a tubular frame 22 under tension, the various hook portions 19 are engaged with apertures 23 formed in said tubular frame.

Referring now to FIGURES 2 and 3, a strip 30 which has been foreshortened in FIGURE 2 for ease of illustration, has two free ends 31, each of which is formed with an aperture 32. An attachment arm 33 (FIGURE 4) of an attachment member 34 extends through each aperture 32, said attachment member consisting of said attachment arm 33 and a support arm 35. One end of the attachment arm 33 engages the support arm 35 by means of a hook portion 36 and said attachment arm 33 is formed at the other end thereof with a hook portion 37.

Referring again to FIGURES 2 and 3, a portion 38 is folded back upon itself about a diametral line of the aperture 32, said diametral line being parallel or substantially parallel to a free edge 39 of said extremity. When thus folded back, the two portions of the extremity 31 are secured to one another by means of a staple 40 which extends through a pair of apertured plates 41, 42, and through the adjacent thicknesses of the two portions of the free end 31, It will be appreciated that whereas the attachment member of FIGURE 5 must be engaged by the extremity 11 before the staple 21 is driven through the two thicknesses of the free end 11, the support arm 35 of the attachment member 34 may be inserted after the free end 31 has been formed as shown in FIGURES 2 and 3. When the support arm 35 has been so inserted, the attachment arm 33 may be made to engage the support arm 35 by means of the hook portion 36. Thus, in the case of use of the attachment member 34 of FIGURE 4, the user may be supplied with the two component parts of the attachment member, and may be left to assemble them himself.

It will be appreciated that either type of attachment member 15 and 34 may be used in connection with platforms 10 or strips 30.

The platform 10 and the strip 30 may either consist wholly of an elastomeric material or may consist of a fabric which is impregnated or coated with an elastomeric material during manufacture. Such resilient materials are well known to those skilled in the art and further description thereof is considered superfluous.

Referring now to FIGURES 6 to 9, a free end of a tape or strip 51 has embedded therein during moulding an attachment member which consists of a support arm 52 and an attachment arm 53. It will be seen that one end of the attachment arm 53 is bent at 54 around the central portion of the support arm 52, and that the material from which the tape is made or of which said free end is made will surround not only the whole support arm 52 but also said one end of the arm 53.

Referring to FIGURES 10 and 11, a support arm 60 has the ends thereof embedded in the material from which the tape 61 or from which the free end of said tape is made, a central portion 62 of said arm 60 being left exposed. This embodiment is intended for sale to users who will themselves engage said central portion 62 with a suitably bent end 64 of an attachment arm 63, arms 63 being sold separately for this purpose.

Referring to FIGURE 12, four free ends 70 have been illustrated of a sheet-like platform 71. The configuration and treatment of said free ends 70 is in accordance with that illustrated in FIGURES 6 and 7 but the modifications of FIGURES 8, 10 and 11 could also be adopted.

Reference has been made above to the various support arms being embedded either in the material from which the tape (or platform) is made or in the material from which the free end is made. The term "embedded in" as employed in this specification and in the appended claims is intended to cover (a) The material (usually metal) of the support arm and attachment arm, mutatis mutandis, having been treated so as to ensure that there will be a chemical bond between said material and said elastomer after vulcanisation or cure of the elastomer; and (b) The support arm and said one end of the attachment arm, mutatis mutandis, being merely physically keyed to the elastomer by virtue of being surrounded thereby. Thus, the tape may be made from, for example, rubberised fabric except at the free ends which could be pure rubber; or because the free ends may be made from a first elastomeric material and the remainder of the tape (or platform) may be made from a second elastomeric material (with or without fabric reinforcement) in accordance with United Kingdom patent specification No. 918,-743. Thus, the elastomer in the free ends may be cured or vulcanised to a degree of hardness greater than that of the cured or vulcanised elastomer in the remainder of the tape (or platform). Said greater degree of hardness should preferably be of 95° to 100° Shore.

The elastomer from which the tape or platform is formed or which forms a part thereof should preferably be cross-linked. Examples of suitable elastomers are natural rubber, styrene butadiene rubber, polyisoprene, cis-polybutadiene, trans-polybutadiene, butyl rubber, a polyurethane, polystyrene, polyethylene and ethylene propylene co-polymers, which may be isotactic.

A tape or platform according to FIGURES 6 to 12 may be suitably formed by a moulding process and may, therefore, consist wholly of elastomeric materials or may also include an insert or inserts of cord fabric or textile fabric. When a moulding process is employed, it is possible to use an elastomer which is capable of being cured to two degrees. During the moulding process the whole tape may be cross-linked or cured to the first degree while the hard portions are formed by cross-linking or curing the free ends to a degree greater than the first degree. An example of suitable elastomers for this process is a polymer such as an unsaturated polyurethane which may be formed in the conventional way, and which may be further cured by thermal cross-linking through the double bonds of the polymer.

It is preferred, however, for commercial reasons at present to form tapes or platforms from two different elastomers. A first elastomer which can be moderately cross-linked may be used for the centre of the tape or platform, while a second elastomer which can be highly crosslinked may be used for the harder areas. These elastomers are placed in a mould and cured, so that, during the curing process, the second elastomer forms the hardened areas. The hardened areas are then joined to the more resilient areas by chemical bonding. Suitable elastomers for the hardened areas are high styrene butadiene co-polymers, polystyrene, polyethylene and ebonite.

When using the curing method described in the last paragraph either the support arm (FIGURES 10 and 11) or the connected support arm and attachment arm may be embedded in the hardened areas by the following method. The elastomer from which the hardened areas are to be formed is placed in the mould in the form of two thin sheets with the arm or arms sandwiched between them. During the curing process the said arm or arms become embedded in the hardened areas.

With a further reference to FIGURE 12, it may be desirable from a practical point of view to provide webs which extend between the various free ends 70 thereof so as effectively to fill up the spaces between these free ends. This would be done in cases where users might object to the possibility of a part of a cushion or other upholstery material projecting downwardly through the spaces.

What I claim as my invention and desire to secure by Letters Patent of the United States is:

1. In combination, a supporting frame, a support member mounted within said frame under tension and formed of flexible and extensible elastomeric material and including a relatively thin flat body portion, said body portion having integral therewith at least two free ends formed of said material and having a certain length and width, and attachment members securing said free ends to said supporting frame, each attachment member embodying a straight support arm having a length consisting of two end regions and a central region bounded by said end regions, a straight attachment arm connected to said support arm to form said attachment member, said support arm and said attachment arm being of rod form, said attachment arm being connected at one end thereof to said support arm at said central region thereof and being disposed normal to said support arm, said attachment arm having a portion of its other end in the form of a hook for attachment to said supporting frame, said end regions of said support arm being secured in engagement with and enclosed by a free end of said material with the support arm extending substantially the full width of such free end and said attachment arm extending longitudinally of and from the longitudinal center of said free end thereby to prevent disengagement of said support arm from said free end when the support member is mounted under tension upon said frame.

2. The invention according to claim 1, wherein each of said free ends consists of a turned back portion of the material forming a double thickness fold and said support arm lies in said fold to form the said enclosure and said attachment arm extends through an aperture in the crease of said fold.

3. In combination, a supporting frame, a support member adapted to be mounted in the said frame under tension and formed at least in part of a vulcanizable flexible and extensible elastomeric material and including a relatively thin body portion, said body portion having integral therewith at least two free ends, said body portion and said free ends having different physical characteristics as regards density, and attaching members securing free ends to said supporting frame, each attaching member embodying an elongate support arm having in its length two end regions and a central region bounded by said end regions, an elongate attachment arm connected at one end to said support arm at said central region thereof and being disposed normal to said support arm, said arms being of rod form, said attachment arm having a portion of its other end in the form of a hook, said frame having means for receiving said hook, said end regions of said support arm being secured in and enclosed by a free end of said material, the support arm extending substantially the full width of the enclosing free end and said attachment arm extending longitudinally of and from the longitudinal center of said free end to prevent disengagement of said support arm from said free end when said support member is mounted under tension upon said supporting frame.

4. The invention according to claim 3, wherein the said different physical characteristics of the body and free ends results from the presence of a fabric in the body impregnated with the elastomer, with said free ends consisting of the elastomer only.

5. The invention according to claim 3, wherein the said different physical characteristics of the body portion and said free ends results from the elastomer of the free ends having a vulcanized or cured degree of hardness greater than that of the cured or vulcanized elastomer in the body portion.

6. The invention according to claim 3, wherein said greater degree of hardness is preferably of about 95°–100° Shore.

7. The invention according to claim 3, wherein the elastomer is cross-linked.

8. In combination, a support frame having apertures therein and having an open center, a flat cushion support platform formed of an elastomeric material and adapted to be mounted upon said frame under tension within said open center, said platform consisting of a flat relatively thin sheet body portion and a plurality of free end members integral therewith having a certain length and a narrow width, each of said free end members having a length thereof folded back upon itself forming two superposed layers and a fold line, each of said free end members having an aperture therein midway between the side edges of the member and bisected by said fold line, means securing said layers together inwardly of said fold line, said platform having first and second right angularly related side edges, certain of said free end members extending from a first side edge of the platform and having an outer longitudinal side edge forming a continuation of a second side edge of the platform, others of said free end members extending from a second side edge of the platform and spaced along said second side edge from and adjacent to one of said certain free end members, and a T-shaped attachment member connecting each of said free end members with said frame, each attachment member consisting of a support arm forming the head of the T and lying between said layers in the fold of said free end member across the said aperture therein and an attachment arm joined at one end to said support arm midway of the ends of the latter and extending outwardly through said aperture and having a hook at its other end engaged in an aperture in said frame and said support arm having a length approximately equal to the width of the free end member.

9. The invention according to claim 8, wherein the said means securing said layers together consists of a staple passing through said layers.

10. The invention according to claim 8, wherein the said means securing said layers together consists of a pair of apertured plates having said layers therebetween and a staple passing through the apertures of said plates and through the layers therebetween.

References Cited

UNITED STATES PATENTS

| | | | |
|---|---|---|---|
| 2,532,713 | 12/1950 | Gottfried | 160—388 |
| 2,645,540 | 7/1953 | Trimble | 160—378 |
| 2,826,245 | 3/1958 | Sellner | 160—404 |
| 2,964,106 | 12/1960 | Nicholas | 160—24 |
| 3,208,085 | 9/1965 | Grimshaw. | |
| 3,225,336 | 12/1965 | Grimshaw | 52—236 |
| 2,144,318 | 1/1939 | Kryder. | |
| 3,217,786 | 11/1965 | Earl | 160—404 |

DAVID J. WILLIAMOWSKY, *Primary Examiner.*

HARRISON R. MOSELEY, *Examiner.*

PHILLIP C. KANNAN, *Assistant Examiner.*